(12) United States Patent
Kim et al.

(10) Patent No.: US 10,046,648 B2
(45) Date of Patent: Aug. 14, 2018

(54) POWER CONTROL SYSTEM FOR HYBRID VEHICLE

(71) Applicant: Hyundai Motor Company, Seoul (KR)

(72) Inventors: Sung Kyu Kim, Gyeonggi-Do (KR); Jun Mo An, Gyeonggi-Do (KR); Su Hyun Bae, Daegu (KR); Mu Shin Kwak, Gyeonggi-do (KR); Joo Young Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 25 days.

(21) Appl. No.: 15/217,114

(22) Filed: Jul. 22, 2016

(65) Prior Publication Data

US 2017/0166068 A1   Jun. 15, 2017

(30) Foreign Application Priority Data

Dec. 15, 2015   (KR) .................. 10-2015-0179165

(51) Int. Cl.
| | | |
|---|---|---|
| *H02P 1/00* | (2006.01) | |
| *B60L 11/18* | (2006.01) | |
| *B60L 15/00* | (2006.01) | |
| *H02P 5/74* | (2006.01) | |
| *H02P 27/06* | (2006.01) | |

(52) U.S. Cl.
CPC ......... *B60L 11/1803* (2013.01); *B60L 15/007* (2013.01); *H02P 5/74* (2013.01); *H02P 27/06* (2013.01); *B60Y 2200/92* (2013.01); *B60Y 2400/61* (2013.01); *H02P 2209/01* (2013.01); *Y10S 903/904* (2013.01)

(58) Field of Classification Search
USPC .................... 318/139, 400.2, 400.26, 801
See application file for complete search history.

(56) References Cited

U.S. PATENT DOCUMENTS

| | | | | |
|---|---|---|---|---|
| 7,157,869 | B2 * | 1/2007 | Ishikawa | ................. B60K 6/44 180/65.225 |
| 2003/0146726 | A1 * | 8/2003 | Ishikawa | ............... B60L 3/0046 318/442 |
| 2005/0116680 | A1 * | 6/2005 | Ishikawa | ................. B60K 6/26 318/801 |

(Continued)

FOREIGN PATENT DOCUMENTS

| | | |
|---|---|---|
| JP | 2007-062640 A | 3/2007 |
| JP | 2007-330022 A | 12/2007 |

(Continued)

*Primary Examiner* — Jorge L Carrasquillo
(74) *Attorney, Agent, or Firm* — Mintz Levin Cohn Ferris Glovsky and Popeo, P.C.; Peter F. Corless

(57) ABSTRACT

A power control system for a hybrid vehicle is provided. The system includes a rechargeable battery, a first motor that is connected to a driving wheel of the vehicle, and a second motor that is connected to the driving wheel of the vehicle. A first inverter is connected to the first motor and a second inverter is connected to the second motor. A converter has a first side connected to the battery and a second side connected to the first inverter. A neutral switch is connected between the first side of the converter and a neutral point of the first motor. A controller executes an on/off of the switch based on whether the first motor is operated and required power of the vehicle.

13 Claims, 1 Drawing Sheet

(56) References Cited

U.S. PATENT DOCUMENTS

| | | | | |
|---|---|---|---|---|
| 2009/0090574 A1* | 4/2009 | Kuno | ................... | B60K 6/365 180/65.265 |
| 2013/0076126 A1* | 3/2013 | Hashimoto | ............. | B60L 1/003 307/9.1 |
| 2013/0147431 A1* | 6/2013 | Lim | ....................... | H02J 7/022 320/109 |

FOREIGN PATENT DOCUMENTS

| | | |
|---|---|---|
| JP | 2009-219200 A | 9/2009 |
| JP | 2010-074885 A | 4/2010 |
| JP | 2011-035991 A | 2/2011 |
| KR | 10-2011-0062694 | 6/2011 |
| KR | 10-2012-0005746 A | 1/2012 |

* cited by examiner

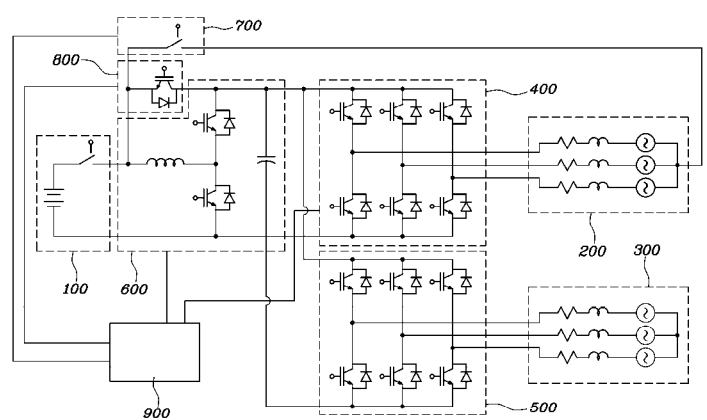

POWER CONTROL SYSTEM FOR HYBRID VEHICLE

CROSS REFERENCE TO RELATED APPLICATION

The present application claims priority to Korean Patent Application No. 10-2015-0179165, filed on Dec. 15, 2015, the entire contents of which is incorporated herein for all purposes by this reference.

BACKGROUND

1. Technical Field

The present invention relates to a power control system for a hybrid vehicle that supplies power to the vehicle using a motor even when required power of the vehicle exceeds maximum power of a converter, by integrally operating a power system of the vehicle including the converter and an inverter and the motor.

2. Description of the Related Art

Many vehicles today use fossil fuel however; the fossil fuel includes sulfur, phosphor, etc., which contribute to environmental pollution. Therefore, the reduction in the use of the fossil fuel for environmental protection is continuously being researched and developed. Environmentally-friendly vehicles such as a hybrid vehicle, an electric vehicle, and a hydrogen fuel vehicle have thus been developed to help alleviate the related problems with fossil fuel vehicles. The hybrid vehicle generates electricity by regenerative braking reversely rotating the motor upon deceleration to charge a battery and improves fuel efficiency and stabilization of exhaust gas by an idle stop and go control turning off an engine upon stopping and restarting the engine with the motor upon starting.

Therefore, in the hybrid vehicle, a driving mode of the vehicle must be controlled to correspond to the vehicle state. The related art teaches a method for controlling motor control system for hybrid vehicle which improves durability of a power apparatus of a hybrid vehicle and improves efficiency of a vehicle by preventing a counter electromotive force of a motor generated upon turning off a main relay of the hybrid vehicle from being applied to a converter and an inverter. However, when the efficiency of the converter is improved by the above-described method, a current amount flowing in the converter is increased, and thus, the size of the inductor connected with the converter, a power module, a cooling apparatus, etc., is increased, thereby increasing costs of the converter and increasing a weight and a volume.

The contents described as the related art have been provided merely for assisting in the understanding for the background of the present invention and should not be considered as corresponding to the related art known to those skilled in the art.

SUMMARY

An object of the present invention is to provide a power control system for a hybrid vehicle capable of increasing driving power of a power system by connecting a switch between a power system of the vehicle and a neutral point of a motor to perform a proper control based on a motor driving state and required power of the vehicle and increasing driving power in an electric vehicle mode of the hybrid vehicle by a bypass switch.

According to an exemplary embodiment of the present invention, a power control system for a hybrid vehicle may include: a rechargeable battery; a first motor connected to a driving wheel of the vehicle to be operated as an electric motor or a generator; a second motor connected to the driving wheel of the vehicle to be operated as the electric motor or the generator; a first inverter connected to the first motor; a second inverter connected to the second motor; a converter having a first side connected to the battery and a second side connected to the first inverter, wherein the second inverter is configured to supply an output voltage obtained by converting a voltage applied from the battery to the first inverter and the second inverter; a neutral switch connected between one side of the converter and a neutral point of the first motor; and a controller configured to execute an on/off of the switch based on whether the first motor is operated and required power of the vehicle.

The controller may be configured to turn on the neutral switch when an operation of the first motor stops and the required power of the vehicle may exceed maximum power of the converter. Additionally, the controller may be configured to operate the first inverter to output only one of three phases of the first inverter when the neutral switch is turned on. The controller may then be configured to operate the first inverter to alternately output only one of three phases of the first inverter when the neutral switch is turned on. The output voltage of the converter may be derived based on a rotating speed of the second motor and a total magnetic flux upon an adjustment of a maximum torque of the second motor. The output voltage of the converter may be derived based on the following Equation.

$$V_{DC} = \sqrt{3} \lambda_{mag} w_r, \lambda_{mag} = \sqrt{\lambda_{ds}^2 + \lambda_{qs}^2}$$

wherein $V_{DC}$: Output voltage of converter, $\lambda_{mag}$: Total magnetic flux upon control of maximum torque of second motor, $w_r$: Rotating speed of second motor, $\lambda_{ds}$: d-axis magneti flux upon control of maximum torque of second motor, $\lambda_{qs}$: q-axis magnetic flux upon control of maximum torque of second motor The controller may be configured to turn off the neutral switch when the first motor is operated. Additionally, the controller may be configured to turn off the neutral switch when an operation of the first motor stops and the required power of the vehicle may be equal to or less than maximum power of the converter. The output voltage of the converter may be derived based on a rotating speed of the first motor, a total magnetic flux upon an adjustment of a maximum torque of the first motor, a rotating speed of the second motor, and a total magnetic flux upon an adjustment of a maximum torque of the second motor.

The power control system for a hybrid vehicle may further include: a bypass switch connected to the converter in parallel at a first side and a second side of the converter, in which the controller may be configured to execute an on/off of the bypass switch to directly supply the power of the battery to the first inverter or the second inverter through the bypass switch. When the hybrid vehicle is in an electric vehicle mode, the controller may be configured to operate the bypass switch to directly supply the power of the battery to the first inverter. When a required power value of the hybrid vehicle exceeds a power limit value preset in the controller, the controller may be configured to operate the bypass switch to directly supply the power of the battery to the first inverter and the second inverter.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings:

FIG. 1 is a configuration diagram of a power control system of a hybrid vehicle according to an exemplary embodiment of the present invention.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described with reference to the accompanying drawings.

As illustrated in FIG. a power control system for a hybrid vehicle according to an exemplary embodiment of the present invention may include: a rechargeable battery 100; a first motor 200 connected to a driving wheel of the vehicle to be operated as an electric motor or a generator; a second motor 300 connected to the driving wheel of the vehicle to be operated as the electric motor or the generator; a first inverter 400 connected to the first motor 200; a second inverter 500 connected to the second motor 300; a converter 600 having a first side connected to the battery 100 and a second side connected to the first inverter 400 and the second inverter 500 to supply an output voltage obtained by converting a voltage applied from the battery 100 to the first inverter 400 and the second inverter 500; a neutral switch 700 connected between one side of the converter 600 and a neutral point of the first motor 200; and a controller 900 configured to execute an on and off of the switch based on whether the first motor 200 is operated and required power of the vehicle.

In the present invention, the neutral switch 700 may be connected between a first side of the converter 600 and the neutral point of the first motor 200. As shown in FIG. 1, when the power of the battery 100 passes through the first motor 200 through the neutral switch 700, power may be applied to the inductor provided in the first motor 200, in which the power may be transferred to the first inverter 400 via the inductor. Therefore, the power transfer structure is the same as the converter 600 and therefore the circuit configuration of the first motor 200 and the first inverter 400 according to the connection of the neutral switch 700 may also obtain the same effect as the converter 600.

However, the circuit configuration has the reduced efficiency, compared to using the converter 600 devised for power conversion, and therefore when the required power of the hybrid vehicle may not be obtained only by the converter 600, power may be adjusted using the neutral switch 700. Therefore, according to the present invention, when the operation of the first motor 200 stops and the required power of the vehicle exceeds the maximum power of the converter 600, the neutral switch 700 may be turned on. In addition to comparing the required power of the vehicle with the maximum power of the converter 600 in the present condition, the condition that the operation of the first motor 200 stops may be added and when the first motor 200 is operated, the circuit configuration using the first motor 200 and the first inverter 400 may not be made and therefore the condition corresponds to an essential condition.

When the neutral switch 700 is turned on according to the above condition, the first motor 200 and the first inverter 400 may be connected to each other and thus may be operated similar to the converter 600. However, when the neutral switch 700 is turned on, the power of the battery 100 applied through the neutral switch 700 may be output to any phase of the first inverter 400. As illustrated in FIG. 1, even though the voltage output from a three-phase inverter according to the present invention may be output to any phase, since only a phase difference of the voltage is present and the magnitude of the voltage is same, the controller 900 may be configured to output any one of the three phases of the first inverter 400. Therefore, the controller 900 according to the present invention may be configured to operate the first inverter 400 to output only one of the three phases of the first inverter 400 when the neutral switch 700 is turned on.

However, even though any of the three phases may be output, it is not preferable to continuously output only one phase. In other words, when only one phase is used, an overheating phenomenon may occur in the first motor 200 and the first inverter 400. Therefore, considering the characteristics of the first motor 200 and the first inverter 400 that may perform the three-phase output, the method may include outputting, by the controller 900, only one phase, alternating the three phases of the first inverter 400.

As described above, when the neutral switch 700 is turned on, the first motor 200 may not be operated. Therefore, the output voltage of the converter 600 may be changed accordingly. It would be inefficient to determine the output voltage of the converter 600 in consideration of the first motor 200 that is not operated. Particularly, the output voltage indicates a voltage to allow the controller 900 to command to the output voltage of the converter 600.

When the neutral switch 700 is turned on, the first motor 200 may not be considered, the output voltage of the converter 600 may be determined using the information of the second motor 300. The present invention suggests a method for using a rotating speed of the second motor 300 and the total magnetic flux upon the adjustment of the maximum torque of the second motor 300 among the information of the second motor 300. In particular, a method for deriving or calculated an output voltage based on the following Equation is suggested.

$$V_{DC}=\sqrt{3}\lambda_{mag}w_r, \lambda_{mag}=\sqrt{\lambda_{ds}^2+_{qa}^2}$$

wherein $V_{DC}$: Output voltage of converter (600), $\lambda_{mag}$: Total magnetic flux upon control of maximum torque of second motor (300), $w_r$: Rotating speed of second motor (300), $\lambda_{ds}$: d-axis magnetic flux upon control of maximum torque of second motor (300), $\lambda_{qs}$: q-axis magnetic flux upon control of maximum torque of second motor (300)

Particularly, the d-axis magnetic flux and the q-axis magnetic flux indicate a magnetic flux value at a coordinate reference used in a synchronous coordinate system of the motor. Unlike the case described above, even though the first motor 200 is operated or the operation of the first motor 200 stops, when the required power of the vehicle is equal to or less than the maximum power of the converter 600, there is no need to implement the converting circuit using the first motor 200 and the first inverter 400 and therefore the controller 900 may be configured to turn off the neutral switch 700.

Further, the output voltage of the converter 600 may be determined in consideration of the first motor 200 and the second motor 300 unlike the case described above and therefore may be derived based on the rotating speed of the first motor 200, the total magnetic flux upon the adjustment of the maximum torque of the first motor 200, the rotating speed of the second motor 300, and the total magnetic flux upon the adjustment of the maximum torque of the second motor 300. In particular, the larger value of the output voltages of the converter 600 according to the first motor 200 and the second motor 300 derived based on the Equation as suggested in the above will be set as the output voltage of the converter 600 by the controller 900.

As can be appreciated from the configuration diagram of FIG. 1, the present invention may further include a bypass switch 800 connected in parallel with the converter 600 at a first side and a second side of the converter 600, in addition to the neutral switch. Accordingly, the power of the vehicle may be improved without the vehicle suffering from a boosting process of the converter 600 when the hybrid vehicle is driven in an electric vehicle (EV) mode. Therefore, according to the present invention, when the vehicle is driven in the EV mode, a current from the battery 100 may flow through the bypass switch 800 without passing through the converter 600 due to the bypass switch 800 connected in parallel to the converter 600. Thus, the flow of current from the battery 100 may pass through only the bypass switch 800 without passing through an inverter, a power module, and a parasitic resistor included in the converter 600 to avoid a resonance occurring due to the existing inductor and capacitor and reduce a power loss due to the parasitic resistor, etc., thereby increasing the efficiency of the system.

For the control of the bypass switch 800, the controller 900 according to the present invention may be configured to execute the on/off of the bypass switch 800 to directly supply the power of the battery 100 to the first inverter 400 or the second inverter 500 through the bypass switch 800. In particular, when the hybrid vehicle is in the electric vehicle mode, that is, the EV mode, the controller 900 may be configured to turn on the bypass switch 800 to directly supply the power of the battery 100 to the first inverter 400. When the requited power of the vehicle is sufficiently satisfied by the power using the first inverter 400, there is no need to drive the second inverter 500. In particular, power may not be supplied to the second inverter 500 and the power of the battery 100 may be supplied to the first inverter 400.

However, unlike the case described above, when the required power value of the vehicle exceeds the power limit value preset in the controller 900 corresponds to when the requited power of the vehicle may not be satisfied by the power of the first inverter 400, and therefore the controller 900 may be configured to operate the bypass switch 800 to directly supply the power of the battery 100 to the first inverter 400 and the second inverter 500. When both of the first inverter 400 and the second inverter 500 are driven, the power of the vehicle is higher compared to when the first inverter 400 is driven, and therefore the required power of the vehicle may be satisfied. Accordingly, the power limit value in the present control step may have various values based on the type and state of vehicles, but it is generally preferable that the maximum power of the first inverter 400 is set to be the output limit value.

As described above, the present invention may obtain the following effects.

First, it may be possible to increase the power of the vehicle through the motor by integrally controlling the power system of the vehicle and the motor.

Second, it may be possible to increase the maximum power of the vehicle by simultaneously driving two motors in the electric vehicle mode.

Third, it may be possible to prevent the heat loss due to the driving of the converter by increasing the maximum power without using the converter.

Although the present invention has been shown and described with respect to specific exemplary embodiments, it will be obvious to those skilled in the art that the present invention may be variously modified and altered without departing from the spirit and scope of the present invention as defined by the following claims.

What is claimed is:

1. A power control system for a hybrid vehicle, comprising:
   a rechargeable battery;
   a first motor connected to a driving wheel of the vehicle to be operated as an electric motor or a generator;
   a second motor connected to the driving wheel of the vehicle to be operated as the electric motor or the generator;
   a first inverter connected to the first motor;
   a second inverter connected to the second motor;
   a converter configured to have a first side connected to the battery and a second side connected to the first inverter and the second inverter to supply an output voltage obtained by converting a voltage applied from the battery to the first inverter and the second inverter;
   a neutral switch connected between the first side of the converter and a neutral point of the first motor; and
   a controller configured to execute an on/off of the neutral switch based on whether the first motor is operated and a comparison result between required power of the vehicle and a predetermined maximum power of the converter.

2. The power control system for a hybrid vehicle of claim 1, wherein the controller is configured to turn on the neutral switch when an operation of the first motor stops and the required power of the vehicle exceeds maximum power of the converter.

3. The power control system for a hybrid vehicle of claim 2, wherein the controller is configured to operate the first inverter to output one of three phases of the first inverter when the neutral switch is turned on.

4. The power control system for a hybrid vehicle of claim 2, wherein the controller is configured to operate the first inverter to alternately output one of three phases of the first inverter when the neutral switch is turned on.

5. The power control system for a hybrid vehicle of claim 2, wherein the output voltage of the converter is derived based on a rotating speed of the second motor and a total magnetic flux upon an adjustment of a maximum torque of the second motor.

6. The power control system for a hybrid vehicle of claim 2, wherein the output voltage of the converter is derived based on the following Equation, $$V_{DC}=\sqrt{3}\lambda_{mag}w_r, \lambda_{mag}=\sqrt{\lambda_{ds}^2+\lambda_{qs}^2}$$

wherein $V_{DC}$: Output voltage of converter, $\lambda_{mag}$: Total magnetic flux upon control of maximum torque of second motor, $w_r$: Rotating speed of second motor, $\lambda_{ds}$: d-axis magneti flux upon control of maximum torque of second motor, $\lambda_{qs}$: q-axis magnetic flux upon control of maximum torque of second motor.

7. The power control system for a hybrid vehicle of claim 1, wherein the controller is configured to turn off the neutral switch when the first motor is operated.

8. The power control system for a hybrid vehicle of claim 1, wherein the controller is configured to turn off the neutral switch when an operation of the first motor stops and the required power of the vehicle is equal to or less than maximum power of the converter.

9. The power control system for a hybrid vehicle of claim 7, wherein the output voltage of the converter is derived based on a rotating speed of the first motor, a total magnetic flux upon an adjustment of a maximum torque of the first motor, a rotating speed of the second motor, and a total magnetic flux upon a control of a maximum torque of the second motor.

10. The power control system for a hybrid vehicle of claim 8, wherein the output voltage of the converter is derived based on a rotating speed of the first motor, a total magnetic flux upon an adjustment of a maximum torque of the first motor, a rotating speed of the second motor, and a total magnetic flux upon a control of a maximum torque of the second motor.

11. The power control system for a hybrid vehicle of claim 1, further comprising:
a bypass switch connected in parallel to the converter in parallel at the first side and the second side of the converter,
wherein the controller is configured to execute an on/off of the bypass switch to directly supply power of the battery to the first inverter or the second inverter through the bypass switch.

12. The power control system for a hybrid vehicle of claim 11, wherein when the hybrid vehicle is in an electric vehicle mode, the controller is configured to operate the bypass switch to directly supply the power of the battery to the first inverter.

13. The power control system for a hybrid vehicle of claim 12, wherein when a required power value of the hybrid vehicle exceeds a power limit value preset in the controller, the controller is configured to operate the bypass switch to directly supply the power of the battery to the first inverter and the second inverter.

* * * * *